Aug. 14, 1956     J. M. KOLBERG     2,759,091
ELECTRIC COOKING DEVICE
Filed May 14, 1956
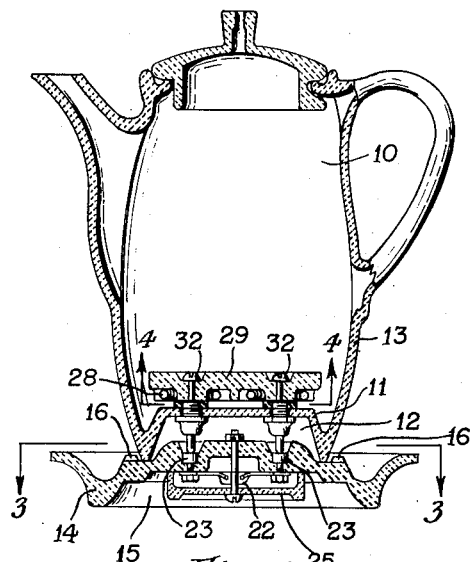
Fig. 1.
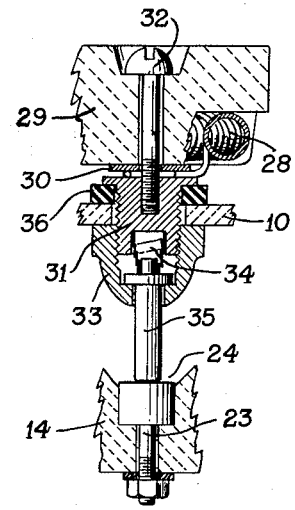
Fig. 2.
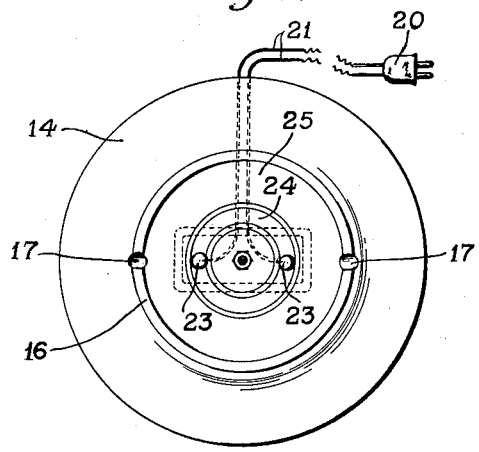
Fig. 3.
Fig. 4.
INVENTOR.
Joseph M. Kolberg
BY

United States Patent Office 2,759,091
Patented Aug. 14, 1956

2,759,091

ELECTRIC COOKING DEVICE

Joseph M. Kolberg, Merrit, N. Y.

Application May 14, 1956, Serial No. 584,628

2 Claims. (Cl. 219—43)

This invention relates to an electric cooking device and, more specifically, to a cooking vessel provided with internal heating means and a base support for said cooking vessel including an electric current supply and control unit.

Electric cooking vessels provided with internal heating means have been known before. However, the main disadvantage of such devices is that, after the liquid content has been heated to the desired temperature or brought to a boil, vessels of this type must be manually disconnected from the current supply, usually by disengaging a plug and socket at the base of the vessel, in order to transfer the vessel for any distance from the cooking position, or in order to transfer the content thereof.

Moreover, electric cooking devices are known that consist of the combination comprising an internally heated cooking vessel and a separate current supply and control unit. The herein disclosed device belongs to this general type, but differs from such previously known devices in that in embodies a novel and more simple and practical construction.

It is, therefore, the primary object of the present invention to provide a device of the character described, comprising a cooking vessel having an internal heating element in combination with a support retaining associated electric power supply and control elements.

It is another object of the invention to provide a device of the aforesaid type that, being of particularly simple and inexpensive construction, may nevertheless be safely and advantageously put to the intended use.

The novel features which I consider characteristic of my invention are set forth with particularity in the appended claims. The invention itself, however, and any additional objects and advantages thereof will be best understood from the following description of a preferred embodiment when read in connection with the accompanying drawings in which:

Fig. 1 is a cross-sectional view of the assembled cooking device,

Fig. 2 is an enlarged, sectional detail illustrating the heating and current supply elements, Fig. 3 is a sectional view on line 3—3 in Fig. 1, and Fig. 4 is a sectional view on line 4—4 in Fig. 1.

In the drawings, the numeral 10 indicates a cooking vessel of conventional shape, in the illustrated case a pot provided with a handle, a spout and a vented cover. Obviously, the cooking vessel of this invention may have any other, convenient shape or design. Intrinsic, however, is the raised bottom 11 of the vessel, which provides a hollow space 12 underneath, whereby the necessary support of the vessel is furnished by the downwardly extended sidewall 13.

The vessel may be made of any suitable material, such as earthenware, porcelain, etc. Associated with the vessel is a base 14, preferably of the same material. This base or plate comprises, as shown, a plurality of concentric ridges on top, with concavities of different depth therebetween. The center portion of the base is slightly raised to provide a hollow space 15 underneath.

The circular ridge 16, which keeps the vessel 10 in a concentrically confined position when placed onto the base 14, is provided with oppositely located notches 17 for draining and, as will be subsequently explained, for the purpose of indicating the rotary position which the vessel 10 must assume in order to close or to open the heating circuit.

By means of a plug 20 and wires 21, the base is supplied with electric current from a suitably located current outlet. The wires enter the hollow space 15 underneath the base through a boring 22 provided for this purpose. There, the wires are fastened to screw bolts 23, passing vertically through the base. These screw bolts carry countersunk heads which, as shown particularly in Fig. 2, are flush with the bottom of the innermost concentric concavity 24 at the base surface. The aforedescribed electric connections at the underside of the base are protected against the outside by means of a cover 25, screwed onto the base.

Fastened inside the vessel 10, at the bottom thereof, is a spiral wire resistor 28, mounted, as shown particularly in Fig. 4, within a protective refractory plate 29 which, in order to enable a better circulation of the liquid content of the vessel for increased heating efficiency may be provided with a plurality of holes. The ends of the wire resistor are held between washers 30 and flanged sleeves 31 that are threaded inside and outside; the inner threads being provided to receive respective screws 32 whereby the washers and flanged sleeves are fastened to the refractory plate, while the outer threads are furnished to fasten the sockets 33 to the said sleeves, in the first instance for securing the heating unit to the bottom of the vessel 10, aided by gaskets 36 inserted between the aforementioned flanges and the bottom of the vessel to provide leak-proof connections. Secondly, the sockets 33 each hold a spring, preferably a volute leaf spring 34, that are biased against contact plungers 35, also held by the sockets.

If the vessel is placed on, say, a table top, the fully extended plungers 35 are about flush with the table top. If, however, the vessel is placed onto the base, whose innermost circular concavity 24 is somewhat higher than the circular concavity 26 wherein the vessel stands, pressure is exerted against the two contact plungers, which increases if the vessel is filled with liquid. Now, if the vessel is placed onto the base so that, in the instant case, the spout and the handle of the vessel are exactly in line with the notches 17 of the base, the plungers 35 are in pressing contact with the countersunk heads of the screwbolts 23 and the electric circuit is closed as long as the vessel remains in this position. Obviously, upon a slight turn of the vessel, the heating circuit can be opened.

It is obvious that many changes and adaptations may be made without exceeding the scope of this invention. Thus, the heating resistor may be furnished in form of a metal enclosed heating element. Or, the contact surfaces of the countersunk heads of the screw bolts 23 may be enlarged in width so that a slight turn of the vessel will not open the heating circuit.

Having described my invention, what I claim as new and desire to secure by Letters Patent is:

1. An electric cooking device comprising a cooking vessel having a spout, a handle opposite the spout, a raised bottom, an internal heating element and, connected to said heating element, two resiliently mounted contact plungers extending downward at equal distance from, and in line with, the center of said raised bottom, a base for said cooking vessel comprising a plurality of circular, concentric ridges and concavities, whereby one of said concavities is appropriately dimensioned to fit the bottom rim of said cooking vessel and to center the cooking vessel on the base, electric circuit elements terminating in flat contact points countersunk into another of said concavities of lesser diameter in juxtaposition with said contact plungers when said cooking vessel is placed onto said base, and means for indicating the circuit-closing and circuit opening rotatory position of the vessel on said base, said means comprising notches cut oppositely into one of said ridges of the base having a diameter that is larger than the diameter of the bottom of said cooking vessel.

2. An electric cooking device comprising a cooking vessel having a raised bottom, an internal heating unit consisting of a refractory plate, a wire resistor mounted at the underside of said refractory plate, two flanged sleeves threaded inside and outside passing through borings in said raised bottom at equal distance from, and in line with, the center of said raised bottom, screws fastening said refractory plate to said flanged sleeves and holding the ends of said wire resistor between washers and the respective flanges and gaskets between the respective flanges and said raised bottom, threaded sockets fitted from underneath over the ends of said flanged sleeves extending from said raised bottom, contact plungers held by, and extending downward from, said sockets, volute leaf springs mounted inside said sockets within recesses of said flanged sleeves, a base for said cooking vessel comprising a plurality of circular, concentric ridges and concavities, whereby one of said concavities is appropriately dimensioned to fit the bottom rim of said cooking vessel and to center the cooking vessel on the base, electric circuit elements terminating in flat contact points countersunk into another of said circular concavities of lesser diameter in juxtaposition with said contact plungers when said cooking vessel is placed onto said base, and means indicating the circuit-closing and circuit-opening rotatory position of the vessel on the base.

References Cited in the file of this patent

UNITED STATES PATENTS

| 883,490 | Schramm | Mar. 31, 1908 |
| 1,062,344 | Mann | May 20, 1913 |
| 1,704,270 | Wells | Mar. 5, 1929 |
| 2,033,468 | Gruenberg | Mar. 10, 1936 |